United States Patent [19]

Hirata et al.

[11] 4,105,310
[45] Aug. 8, 1978

[54] INDICATING DEVICE FOR MOTION PICTURE CAMERA

[75] Inventors: Hiroshi Hirata; Takashi Kondo, both of Sakai, Japan

[73] Assignee: Minolta Camera Kabushiki Kaisha, Osaka, Japan

[21] Appl. No.: 747,697

[22] Filed: Dec. 6, 1976

[30] Foreign Application Priority Data

Dec. 24, 1975 [JP] Japan .................. 50-175649

[51] Int. Cl.² .................................... G03B 1/60
[52] U.S. Cl. ............................ 352/171; 354/53
[58] Field of Search ............ 352/170, 171, 172; 354/53

[56] References Cited

U.S. PATENT DOCUMENTS

| | | |
|---|---|---|
| 3,205,507 | 9/1965 | Hochstein ............... 352/171 |
| 3,519,340 | 7/1970 | Vockenhuber ........... 352/171 |
| 3,782,813 | 1/1974 | Isono ..................... 352/171 |

*Primary Examiner*—Monroe H. Hayes
*Attorney, Agent, or Firm*—Watson, Cole, Grindle & Watson

[57] ABSTRACT

An indicating lamp disposed on a camera housing so as to be observed by a person to be photographed is energized in two different modes respectively before and after a film has been exhausted or nearly completely used. A power-supplying circuit for energizing the indicating lamp includes first and second switches connected in parallel with each other for supplying electric power to the indicating lamp. The first switch is repeatedly closed and opened due to the operation of the motion picture camera while the second switch is opened or closed immediately before the film is exhausted or nearly completely used.

8 Claims, 5 Drawing Figures

INDICATING DEVICE FOR MOTION PICTURE CAMERA

BACKGROUND OF THE INVENTION

This invention relates to a device for indicating the operational condition of a motion picture camera using a light emitting element and a sounding element.

In the case of taking a picture of a person, it is often convenient for the person being photographed to be notified of the time that the photographing is about to start. Particularly, a sound motion picture camera which has recently come into commercial use enables the synchronous recording of the narration of the person being photographed. In such a case, it is mandatory to start taking the picture simultaneously with the start of the narration, and therefore the time to start taking a picture should be notified to the person being photographed to ensure good timing. Moreover, it would also be convenient for the person to be photographed to be notified when the film has run out, because narration is then no longer required. Where it is desired to indicate by means of a single indicating element, that a camera is operating and/or that the film has run out, it is essential to provide different types of indications for the aforesaid two cases, so that the person being photographed will not commit a mistake in recognizing the particular case. However, the photographer should devote his attention to the viewfinder while photographing, so that he can hardly recognize the exhaustion of the film, whereas he can easily recognize the operation of the camera.

SUMMARY OF THE INVENTION

It is, accordingly, an object of the present invention to provide an indicating device for a motion picture camera, which device distinguishably informs a person to be photographed of the operation of the motion picture camera and of the exhaustion of the film with a single indicating element.

Another object of the present invention is to provide an indicating device for a motion picture camera, which device not only distinguishably informs a person to be photographed of the operation of the motion picture camera and of the exhaustion of the film but also informs the photographer of the exhaustion of the film.

To accomplish these objects, the motion picture camera of the present invention includes a camera housing, an electric motor, a film winding mechanism coupled with the motor for winding up a film, a shutter coupled with the motor to be driven for exposure of the film, and an indicating device for indicating the operation of the winding-up mechanism and the shutter, and the exhaustion of the film. The indicating device includes indicating means having an indicating element which is disposed on the camera housing such that energization thereof can be recognized by the person to be photographed. The indicating device further includes a power-supplying circuit for energizing the indicating means. The power-supplying circuit has first and second switches which are connected in parallel with each other for supplying electric power to the indicating element. Moreover, in order to actuate these switches, first and second switch actuating means are provided. The first switch actuating means, coupled with the film winding-up mechanism, repeatedly switches the first switch from its closed position to its opened position and vice versa, while the second switch actuating means switches the second switch from either its closed or opened position to the other position immediately before the film has been exhausted or nearly completely used.

In one embodiment of the present invention, the second switch is normally at its opened position and is switched to its closed position immediately before the film has been exhausted or almost completely wound-up. As a result, the indicating element is intermittently energized through the first switch upon the operation of the film winding mechanism and the shutter, but continuously energized through the second switch when the film has been almost exhausted or almost completely wound-up.

In another embodiment of the present invention, the second switch is normally at its closed position and switched to its opened position immediately before the film has been exhausted or almost completely wound-up. As a result, the indicating element is continuously energized through the second switch upon the operation of the film winding mechanism and the shutter, but intermittently energized when the film has been almost exhausted or wound up.

In both of the embodiments, the change of the energization modes of the indicating element enables the person to be photographed to distinguishably recognize the operation of the motion picture camera and the exhaustion of the film.

Particularly for a sound motion picture camera, a light emitting element, such as a lamp, and a light emitting diode are most preferable as the indicating element. In order to inform the photographer of the exhaustion of the film with such a light emitting element, the indicating means further includes a viewfinder and means for introducing the light from the light emitting element to the viewfinder. Alternatively, it is possible to mount another light emitting element in the viewfinder to inform the photographer of the exhaustion of the film. In this case, the power-supplying circuit is provided with a third switch for supplying electric power to the light emitting element in the viewfinder. Preferably, the third switch is designed to be switched by the second switch actuating means from either its closed or opened position to the other position immediately before the film has been exhausted or wound-up, although it may be designed to be switched by another switch actuating means.

These and other objects and features of the present invention will become more apparent from the following description taken in connection with the accompanying drawings.

DETAILED DESCRIPTION OF THE PREFERRED EMBODIMENTS

Figure 1:
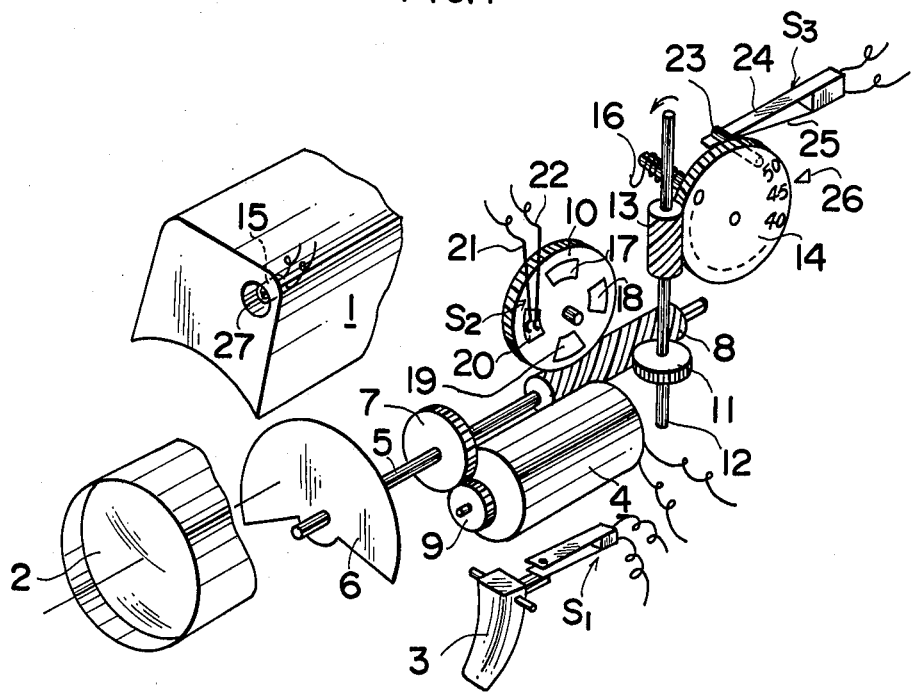
FIG. 1 is a perspective view of a motion picture camera according to a first embodiment of the present invention.
Figure 2:
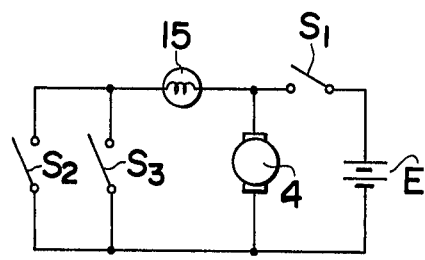
FIG. 2 is a circuit diagram for the first embodiment.

With respect to FIGS. 1 and 2, shown are housing 1 of a motion picture camera, objective lens 2, and release lever 3, which is adapted to close switch S1 when closed to start motor 4. Rotary shaft 5 carries shutter blade 6, gear 7 and worm gear 8. Gear 7 is in meshing relation with gear 9 mounted on a shaft of motor 4, and worm gear 8 is in meshing relation with film winding gear 10 connected to a film winding shaft of a film cartridge (not shown) as well as to gear 11 to drive the film counter mechanism. The film counter mechanism comprises counter gear 14 meshing with worm gear 13, which is mounted on shaft 12 coaxially with gear 11, and return spring 16 forcing counter gear 14 to rotate in the reverse direction. When a film cartridge (not shown) is taken out of the film chamber, shaft 12 is rotated in the direction of the arrow to thereby disengage worm gear 13 from counter gear 14, whereby counter gear 14 is rotated in the reverse direction to return to its initial position by spring 16.

Indicating lamp 15 is disposed behind aperture 27 provided in a front wall of camera body 1, so as to be seen by the person being photographed. Indicating lamp 15 is connected by switch S1 to the anode of battery cell E and by switches S2 and S3 to the cathode of battery cell E. Switches S2 and S3 are connected to each other in parallel relation, as seen in FIG. 2, so that indicating lamp 15 will be lit when switch S1, and one or both of switches S2 and S3 are closed. Switch S2 consists of electrically conductive contacts 17, 18, 19 and 20, which are disposed at a given spacing from one another on one side surface of gear 10; and contacting elements 21 and 22 are disposed in opposing relation to the aforementioned electrically conductive contacts. Switch S2 is arranged to be closed only when contacting elements 21 and 22 connect with one of the electrically conductive contacts 17, 18, 19 and 20 by the rotation of film winding gear 10. Switch S3 consists of contacting piece 24 having one end positioned within the locus of rotation of electrically insulating pin 23 on counter gear 14, and another contacting element 25 confronting contacting element 24. Switch S3 is adapted to be closed by electrically insulating pin 23 when counter gear 14 is rotated to assume a position immediately before a film-running-out position (e.g. a position in which index 26 points at numeral 50 in FIG. 1). Motor 4 is connected in parallel with indicating lamp 15 and by switch S1 to the opposite terminals of battery cell E.

In operation, when release lever 3 is pulled to turn switch S1 on, then motor 4 starts running, thereby rotating rotary shaft 5 through gears 9 and 7, whereby film feeding gear 10 and shutter blade 6 are rotated to feed the film as well as to expose the film to light. Also, gear 11 is rotated to rotate counter gear 14 through worm gear 13.

When film feeding gear 10 starts rotating, contacts 21 and 22 of switch S2 are brought into contact with contacts 17, 18, 19 and 20 successively, whereby switch S2 will be closed and opened at given intervals, thereby flashing indicating lamp 15 at a given frequency. The flashing of indicating lamp 15 indicates that the motion picture camera is operating and notifies the person that he or she is being photographed. If the operator of the motion picture camera releases his fingers from release lever 3 during the photographing, then switch S1 is opened, and motor 4 stops, and indicating lamp 15 is turned off. Thus, the person being photographed can be notified of the interruption.

If photographing is continued until immediately before the film runs out, electrically insulating pin 23 on counter gear 14 urges contacting element 24 against contacting element 25 to close switch S3. At this time, switch S2 is turned on and off at a given frequency as described, and when switch S3 is closed, indicating lamp 15 is kept lit, so that the person being photographed is notified that the film will run out before long. Electrically insulating pin 23 should preferably be arranged to close switch S3 about ten seconds before the film runs out.

In this embodiment, indicating lamp 15 is turned on and off during the normal operation of the motion picture camera, and is kept lit immediately before the film runs out. Thus, the person being photographed can distinguish by the mode of indication of lamp 15 whether the camera is operating or the film will soon run out.

Figure 3:
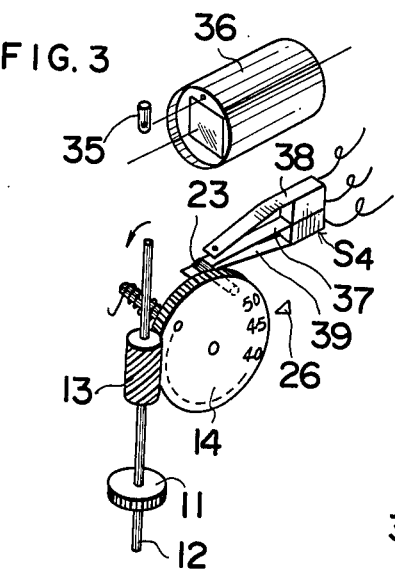
FIG. 3 is a perspective view of a switch actuating mechanism according to a second embodiment of the present invention.
Figure 4:
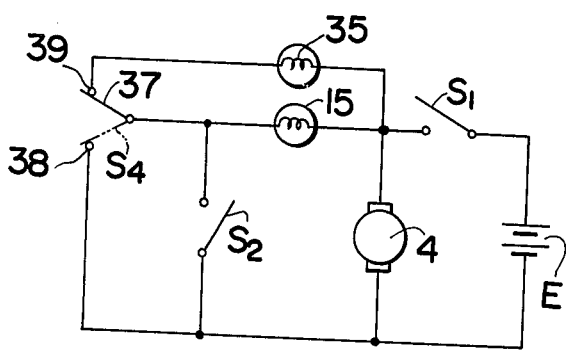
FIG. 4 is a circuit diagram for the second embodiment.

FIGS. 3 and 4 show another embodiment, in which indicating lamp 35 is provided in a finder optical system, so that the person being photographed as well as the camera operator can be notified that the film has run out.

In FIG. 3, eye-piece 36 forms part of a known finder optical system, and indicating lamp 35 is disposed in the front of the eye-piece in the optical path thereof. Indicating lamp 35 is connected in parallel to indicating lamp 15 disposed in the same manner as in FIG. 1, and adapted to be turned on with the actuation of change-over switch S4. Change-over switch S4 consists of contacting element 37, having one end within the locus of rotation of electrically insulating pin 23, and two contacting elements 38 and 39 provided on the opposite sides of contacting element 37 in a sandwiched fashion. Contacting element 37 is normally maintained in contact with contacting element 38, and is adapted to be forcibly disconnected from contacting element 39 by being pushed by electrically insulating pin 23, and then brought into contact with contacting element 39, immediately before the film runs out.

If switch S1 is closed by the release operation before the film runs out, then motor 4 starts rotating, as in the preceding embodiment, thereby turning switch S2 on and off at a given frequency. In this embodiment, contacting elements 37 and 38 of switch S4 are maintained connected with each other, so that indicating lamp 15 is lit. Indicating lamp 35 remains off since the lamp is disconnected from battery cell E. When contacting element 37 of switch S4 contacts contacting element 39 immediately before the film runs out, indicating lamp 15 begins flashing at a given frequency in association with the actuation of switch S2. Because indicating lamp 35 is connected by switch S2 to battery cell E, it flashes at the same frequency as indicating lamp 15.

In this embodiment, the motion picture camera operator is only notified that the film runs out, through the flashing of indicating lamp 35, while the person being photographed can learn by the continuous lighting or the flashing of the indicating lamp 15, whether the motion picture camera is operating or the film has run out. This embodiment is advantageous in that these different indications are all given through a single electrical circuit arrangement.

Figure 5:
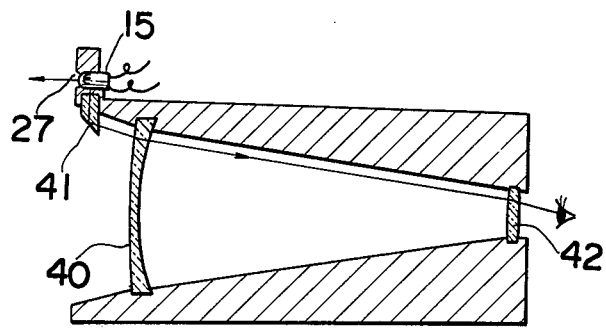
FIG. 5 is a cross-sectional view of a viewfinder according to a third embodiment of the present invention.

FIG. 5 shows a further embodiment, which is modified on the basis of the indicating device shown in FIGS. 1 and 2. In this embodiment, only a single indicating lamp 15 is used to give indications to the motion picture camera operator as well as to the person being photographed. Indicating lamp 15 is disposed on the front wall of camera housing 1 which is located in front of finder objective lens 40, so that the light emitted from indicating lamp 15 may be reflected from transparent block 41, then directed through objective lens 40 and eye-piece 42 and into the operator's eye.

The various embodiments described above may be modified in the following exemplary ways. For example, in place of indicating lamps 15 and 35, other type light emitting elements such as LEDs (light emitting diodes), or a sounding element, such as a buzzer, may be used. Indicating lamp 15 may be positioned in any place other than the front wall of the camera housing as long as the lamp may be seen from the front of the motion picture camera.

The above description has been made without specifying whether the motion picture camera is an ordinary type camera using a silent film or a sound motion picture camera using a sound film. The indicating device of the present invention may be used in any type of motion picture. The indicating device of the present invention is particularly useful for a sound motion picture camera, in which the synchronous recording of the narration of the person being photographed and the photographing may be both accomplished. Where the indicating device of the present invention is used in a sound motion camera, the indicating element should preferably be a light emitting element, rather than a sound emitting element to avoid recording the indicating sound on the film.

What is claimed is:

1. In a motion picture camera including a camera housing, an electric motor, a film winding mechanism coupled with said motor to be driven for winding-up a film, and a shutter coupled with said motor to be driven for exposure of said film, an indicating device comprising:

indicating means including a first light emitting element disposed on said camera housing such that energization thereof can be recognized by a person to be photographed;

a power-supplying circuit for energizing said indicating means, said power-supplying circuit including first and second switches connected in parallel with each other for supplying electric power to said first light emitting element;

first switch actuating means coupled with said film winding mechanism for repeatedly switching said first switch from its closed position to its opened position and vice versa; and a counter mechanism coupled with said film winding mechanism for indicating the amount of film used, said counter mechanism including second switch actuating means for switching said second switch from either its closed or opened position to the other position immediately before said film has been exhausted.

2. An indicating device as defined in claim 1, wherein said second switch actuating means includes a counter disc coupled with said film winding mechanism for indicating the amount of said film having been exhausted and having thereon a switch actuating member engageable with said second switch to switch the same from either its closed or opened position to the other position immediately before said film has been exhausted.

3. A motion picture camera as in claim 1, wherein said film winding mechanism includes a gear driven by said motor, said first switch actuating means includes a plurality of contacts mounted on the surface of said gear and a stationary pair of contacts mounted to successively engage each of said plurality of stationary contacts with rotation of said gear; and said counter mechanism including a rotatable counter gear coupled to be driven by said motor, and said second switch actuating means including projection means extending from said counter gear to periodically close said second switch upon rotation of said counter gear.

4. An indicating device as defined in claim 1, wherein said light emitting element is disposed on the front wall of said camera housing.

5. An indicating device as defined in claim 1, wherein said indicating means includes a viewfinder and means for introducing the light from said light emitting element into said viewfinder.

6. An indicating device as defined in claim 1, wherein said indicating means includes a second light emitting element disposed such that energization thereof can be recognized by the photographer, and said power-supplying circuit includes a third switch for supplying electric power to said second light emitting element, said third switch being coupled with said second switch actuating means to be switched from either its closed or opened position to the other position immediately before said film has been exhausted.

7. An indicating device as defined in claim 6, wherein said third switch is connected in series with said first switch for supplying electric power to said second indicating element.

8. An indicating device as defined in claim 6, wherein said indicating means further includes a viewfinder and said second light emitting element is disposed in said viewfinder so as to be observed therethrough.

* * * * *